US012708117B2

(12) United States Patent
Beghetto et al.

(10) Patent No.: US 12,708,117 B2
(45) Date of Patent: Aug. 18, 2026

(54) SURFACE ANTIMICROBIAL TREATMENTS

(71) Applicant: CROSSING S.r.l., Treviso (IT)

(72) Inventors: Valentina Beghetto, Treviso (IT); Vanessa Gatto, Treviso (IT); Silvia Conca, Treviso (IT); Noemi Bardella, Treviso (IT)

(73) Assignee: CROSSING S.R.L., Treviso (IT)

( * ) Notice: Subject to any disclaimer, the term of this patent is extended or adjusted under 35 U.S.C. 154(b) by 434 days.

(21) Appl. No.: 18/265,799

(22) PCT Filed: Dec. 7, 2021

(86) PCT No.: PCT/IB2021/061411

§ 371 (c)(1),
(2) Date: Jun. 7, 2023

(87) PCT Pub. No.: WO2022/123441

PCT Pub. Date: Jun. 16, 2022

(65) Prior Publication Data

US 2024/0074437 A1 Mar. 7, 2024

(30) Foreign Application Priority Data

Dec. 11, 2020 (IT) ........................ 102020000030179

(51) Int. Cl.

| | |
|---|---|
| ***A01N 55/00*** | (2006.01) |
| ***A01N 25/02*** | (2006.01) |
| ***A01N 25/10*** | (2006.01) |
| ***A01N 25/34*** | (2006.01) |
| ***A01N 43/707*** | (2006.01) |
| ***A01N 43/84*** | (2006.01) |
| ***A01P 1/00*** | (2006.01) |

(52) U.S. Cl.
CPC ............ *A01N 55/00* (2013.01); *A01N 25/02* (2013.01); *A01N 25/10* (2013.01); *A01N 25/34* (2013.01); *A01N 43/707* (2013.01); *A01N 43/84* (2013.01); *A01P 1/00* (2021.08)

(58) Field of Classification Search
CPC ........ A01N 55/00; A01N 25/02; A01N 25/10; A01N 25/34; A01N 43/707; A01N 43/84; A01N 33/12; A01N 43/66; A01P 1/00
See application file for complete search history.

(56) References Cited

U.S. PATENT DOCUMENTS

| | | | |
|---|---|---|---|
| 5,096,738 A * | 3/1992 | Wyman .................... | C09D 4/00 428/447 |
| 2012/0029143 A1* | 2/2012 | Sepeur ..................... | C09D 4/00 427/255.6 |
| 2019/0185627 A1* | 6/2019 | Beghetto .................. | C14C 3/26 |

* cited by examiner

*Primary Examiner* — Mina Haghighatian
*Assistant Examiner* — Nathan W Schlientz
(74) *Attorney, Agent, or Firm* — Wenderoth, Lind & Ponack, L.L.P.

(57) ABSTRACT

Compositions comprising triazine quaternary ammonium salts and silane compounds, their method of preparation and use which provides for the application of the compositions to surfaces or materials of different chemical nature to which they confer antimicrobial and antifouling properties. The material obtained with the described treatment does not release antimicrobial or antifouling agents into the environment in contact, and from the surfaces or materials treated.

19 Claims, 2 Drawing Sheets

1 A

1 B

2A

2B

SURFACE ANTIMICROBIAL TREATMENTS

FIELD OF APPLICATION OF THE INVENTION

The present invention relates to compositions comprising triazine quaternary ammonium salts and silane compounds, method of preparation and method of use thereof by their application to surfaces or materials having different chemical nature. Such compositions confer antimicrobial and antifouling properties to the substrates which they are applied on. The invention provides thereby a method to make antimicrobial/antifouling a surface or material through a simple two-step procedure which does not involve the formation of useless by-products. The products/materials obtained by the treatment using the compositions here described do not release antimicrobial or antifouling agents into the environment with which it comes in contact, and from the surfaces or materials treated there is no release of chemicals over time.

BACKGROUND

Microbiological contamination is a general problem affecting not only health or food sector, but all environments characterized by a significant inflow of people such as public environments, means of transport, schools, all work environments and the production areas. Microorganisms, including pathogens, are ubiquitous and, if not properly controlled, can lead to disease spreading and, at the same time, artifacts and productions damaging.

The degradative effect on the products is significantly increased in the case of moist, which favors microbial proliferation.

In order to find new solutions to the problem of bacterial contamination, in the last decade considerable progress in the development of antimicrobial materials has been made. Contamination concerns the several products including textiles, health and food. The relevance of these studies is therefore strategic for industrial production and everyday life.

The modification of surfaces by antimicrobial treatments is one of the solutions adopted. For example, quaternary ammonium salts are used to prepare efficient polymeric systems for antimicrobial treatment of surfaces.

EP 1863865 describes antimicrobial homopolymers based on silicones containing quaternary ammonium salts (QAS) providing surfaces with a permanent antimicrobial effect. The preparation of the homopolymer requires long times, high water consumption, using numerous chemical reagents, solvents, and energy.

EP 0702686 describes antimicrobial siloxane QAS, to be included in thermoplastic polymers which can be extruded in melt to form fibers or other shaped articles.

WO 2007/098199 discloses a surface biocidal treatment based on highly dendrimeric silane polymers modified with QAS. The polymeric biocide can be applied by hydrolysis to different substrates.

US 2010/0247889A1 describes the deposition on polyester film of coatings based on commercial siloxane QAS. The treatment involves the extrusion and filming of polyester containing antimicrobial agents, such as silver ions, and subsequent deposition of a silane-based QAS coating. The material has antimicrobial properties due to the combination of the antimicrobial agents dispersed in the polyester and the silane QAS coating.

US 2017/0273307 describes the method for preparing and using an antimicrobial coating based on silanes modified with an antimicrobial compound by azide-alkyne cycloaddition.

U.S. Pat. No. 8,491,922 describes the use of a solution of isopropyl alcohol and a silane functionalized with a long-chain QAS. The solution can be sprayed on the surface or deposited using a wipe soaked in the solution. Alternatively, a pre-polymer or a polymer deposited on a surface can be modified by grafting to obtain an antimicrobial surface.

CN 110734566A describes the use of (3-aminopropyl) triethoxysilane to modify biomedical materials surfaces by functionalizing the surface with QAS resistant to *Staphylococcus aureus, Escherichia coli* and *Pseudomonas aeruginosa*. The process requires several steps: 1) pre-treatment of the surface with a very aggressive and dangerous to use $H_2O_2/H_2SO_4$ solution; 2) deposition of APTES ((3-aminopropyl) triethoxysilane); 3) grafting of the active principle in the presence of a condensation activator.

WO 2016/130837 describes an antimicrobial coating, preferably composed of a silane and triethanolamine, which is deposited on a surface. The method requires activation of the surface to be treated by adding a titanium-based photocatalyst.

WO 2017/220435 A1 discloses 1,3,5 triazine derivatives used as condensation, cross-linking, tanning, grafting, and curing agents on various materials. The disclosed grafting reaction occurs between a polymer possessing reaction groups with compounds possessing reacting groups such as carboxylic acids, primary or secondary amines, alcohols, but it does not involve a silane compound or a derivative thereof.

US 2012/0029143 discloses compositions and process for coating different material with silanes, wherein the silanes compounds undergoing an organic cross-linking reaction with organic monomers, oligomers or polymers results in coating material to be applied onto a substrate by spraying, immersion, flooding, rolling, painting, printing, throwing, blade coating. The disclosed compositions and process do not involve a triazine compound or a derivative thereof. The resulting coating provides scratch-, corrosion-, abrasion-resistance and/or chemical resistance to acids and bases. It is disclosed that the coating is used for conferring antimicrobial properties to the substrate, but relevant data about the antimicrobial activity of the treated materials are not provided.

The above methods share a high complexity level as the processes require numerous steps, high consumption of chemical reagents and organic solvents, and, consequently, are characterized by low yields and high costs.

Therefore, there is a strong need to have compounds, compositions and treatment methods capable of providing a coating to materials and surfaces that may contain germicidal substances, such as quaternary ammonium compounds. Optimally, such compounds, compositions and treatment methods should be prepared or achieved by a simple process, shortly, with reduced consumption of water and solvents, reduced use of chemical reagents, high yield, easy to apply to surfaces and such as to provide an effective and long-lasting treatment, without releasing toxic substances over time.

SUMMARY OF THE INVENTION

An object of the present invention is a composition comprising at least one silane compound and at least one triazine quaternary ammonium salt having the ability to make antimicrobial the surface of products and objects of several materials on which it is applied.

Another object of the present invention relates to the process for preparing the composition comprising at least one silane compound and at least one quaternary triazine ammonium salt referred to above, and its use to make the treated surfaces antimicrobial and antifouling.

The surfaces treated and made antimicrobial and antifouling by the method that uses the composition comprising at least one silane compound and at least one triazine quaternary ammonium salt are also an object of the present invention. The surfaces treated according to the method of use of the invention do not release the antimicrobial and/or antifouling agents in the environment and in the materials in contact, maintaining the antimicrobial and/or antifouling activity unchanged over time.

BRIEF DESCRIPTION OF THE DRAWINGS

FIG. 1A: control PP surface, untreated (PP);

FIG. 1B: PP surface treated with the process of the invention and subsequently placed under the conditions of a normal packaging life cycle.

FIG. 2A: control tissue, untreated (T);

FIG. 2B: fabric treated with the process of the invention (Tt).

DETAILED DESCRIPTION OF THE INVENTION

Figure 1:
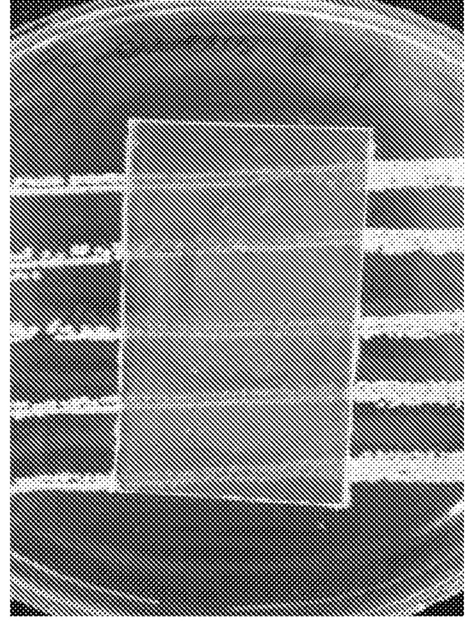
FIG. 1: Determination of bacterial growth on a polypropylene (PP) surface treated according to the invention.
Figure 1:
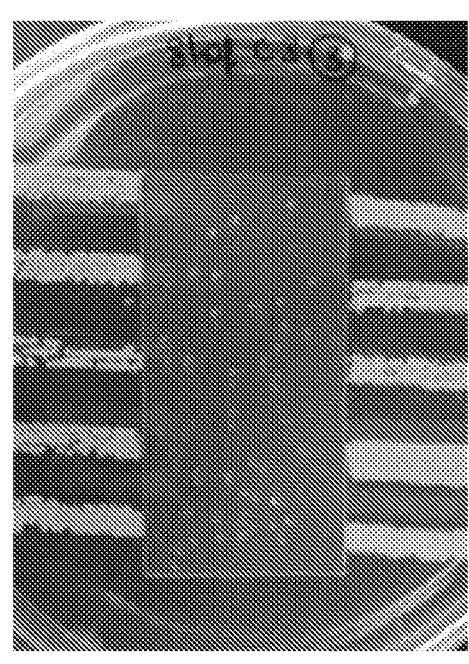
Figure 2:
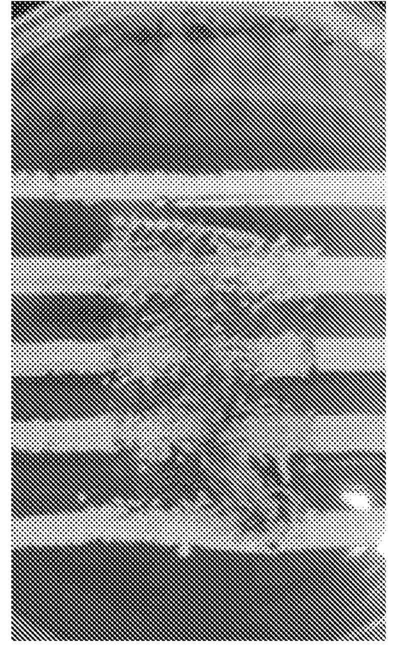
FIG. 2: Determination of bacterial growth on a fabric treated according to the invention.
Figure 2:
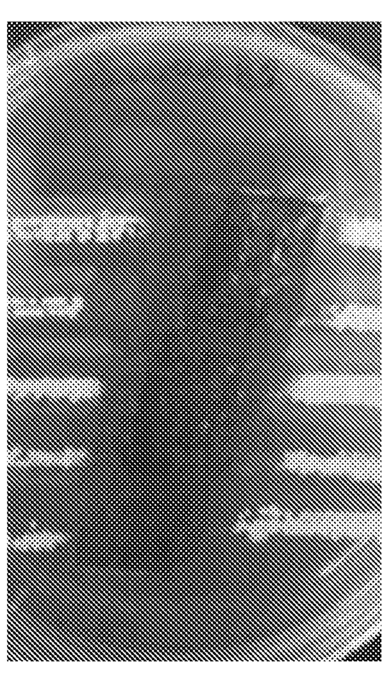
Figure 2:
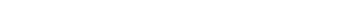

The present invention solves the aforementioned problems through the compositions and the method described, and in particular a method for controlling the diffusion and degradative activity of microorganisms on the surfaces of various products and manufactured articles, by applying a composition comprising at least one silane compound and at least one triazine quaternary ammonium salt. The composition has antimicrobial, antifouling, antifungal, sanitizing, antiviral activity that make it suitable for forming a coating and providing an antimicrobial, hydrophobic or barrier effect treatment on the surfaces of products and manufactured articles.

In this description, the expression "antimicrobial composition" and "antimicrobial treatment" means a composition or a treatment having antibacterial, antifouling, antifungal, sanitizing, antiviral activity.

A first aspect of the present invention relates to a composition comprising at least one silane compound of formula I, F(I), and at least one triazine quaternary ammonium salt of formula II, F(II).

Compound F(I) is a silane compound, characterized by at least one hydrolyzable substituent,

F(I)

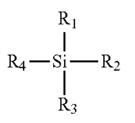

wherein:

$R_1$, $R_2$ and $R_3$ can independently be the same or different and selected from the group consisting of: hydrogen atom, hydroxyl, linear or branched C1-C6 alkoxyl, linear or branched C1-C18 alkyl, and polysilane chain —$(R_xSi(R_y)_2)_nR_y$ wherein Rx and Ry are independently the same or different and chosen from the group consisting of: hydrogen atom, oxygen atom, hydroxyl, linear or branched C1-C6 alkoxyl, linear or branched C1-C18 alkyl and n is between 1 and 20, $R_4$ is selected from the group consisting of: hydrogen atom, hydroxyl, linear or branched C1-C6 alkoxyl, linear or branched C1-C18 alkyl, —$NH_2$, —SH and linear or branched C1-C18 alkyl group functionalized with —$C_nH_{2n}OH$, —$C_nH_{2n}NH_2$, —$C_nH_{2n}NCO$, —$C_nH_{2n}SH$ with n between 1 and 18.

Compound F(II) is a quaternary ammonium salt derived from 1,3,5-triazine

F(II)

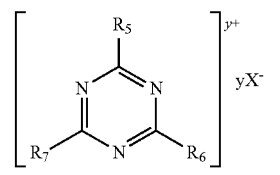

wherein at least one substituent is linked to the triazine by quaternized nitrogen atom or in which a nitrogen atom is positively charged, y is between 1 and 2 and $X^-$ is an anion of an inorganic salt, wherein:

$R_5$ is linked through a quaternized nitrogen atom and is selected from the group consisting of: N-alkylmorpholine, $OC_4H_8N$—$C_mH_{(2m+1)}$ with m between 2 and 18; amide deriving from a carboxylic acid and N-(aminoalkyl) morpholine, $OC_4H_8NC_mH_{2m}NHCOC_nH_{(2n+1)}$ with m between 1 and 8 and n between 4 and 14; ester deriving from a carboxylic acid and N-(hydroxyalkyl) morpholine, $OC_4H_8NC_mH_{2m}OCOC_nH_{(2n+1)}$ with m between 1 and 5 and n between 4 and 14; N-alkylimidazole, $NC_3H_3N$—$C_mH_{(2m+1)}$ with m between 1 and 10; amide deriving from a carboxylic acid and N-(aminoalkyl) imidazole, $NC_3H_3NC_mH_{2m}NHCOC_nH_{(2n+1)}$ with m between 1 and 10 and n between 4 and 14; ester deriving from a carboxylic acid and N-(hydroxyalkyl) imidazole, $NC_3H_3NC_mH_{2m}NHCOC_nH_{(2n+1)}$ with m between 1 and 10 and n between 4 and 14; amide deriving from a carboxylic acid and N-(aminoalkyl) piperidine, $C_5H_{10}NC_mH_{2m}NHCOC_nH_{(2n+1)}$ with m between 2 and 7 and n between 4 and 14; ester deriving from a carboxylic acid and N-(hydroxyalkyl) piperidine, $C_5H_{10}NC_mH_{2m}OCOC_nH_{(2n+1)}$ with m between 2 and 6 and n between 4 and 14; N-alkylpyrrolidine, $C_4H_8NC_mH_{(2m+1)}$ with m between 1 and 6; amide deriving from a carboxylic acid and N-(aminoalkyl) pyrrolidine, $C_4H_8NC_mH_{2m}NHCOC_nH_{(2n+1)}$ with m between 2 and 6 and n between 4 and 14; ester deriving from a carboxylic acid and N-(hydroxyalkyl) pyrrolidine, $C_4H_8NC_mH_{2m}OCOC_nH_{(2n+1)}$ with m between 2 and 6 and n between 4 and 14; diethylalkylamine, $N(C_2H_5)_2(C_mH_{(2m+1)})$ with m between 2 and 18; N', N'-diethylalkyl-diamine, $(C_2H_5)_2NC_mH_{(2m+1)}NH_2$ with m between 1 and 7; amide deriving from a carboxylic acid and N', N'-diethylalkyl-diamine, $(C_2H_5)_2NC_mH_{2m}NHCOC_nH_{(2n+1)}$ with m between 1 and 7 and n between 4 and 14; (diethylamino) alkyl-ol, $(C_2H_5)_2NC_m$ $H_{(2m+1)}OH$ with m between 1 and 8; ester deriving from a carboxylic acid and (diethylamino) alkyl-ol, $(C_2H_5)_2NC_mH_{2m}OCOC_nH_{(2n+1)}$ with m between 1 and 8 and n between 4 and 14, $R_6$ can be equal to $R_5$ or be chosen from: halogen; linear or branched C1-C10 alkoxy; aryloxy; linear or branched alkylamine —$NHC_mH_{(2m+1)}$ with m between 10 and 18; —NH-alkyl-Si—$(R_y)_3$ and —O-alkyl-Si—$(R_y)_3$ with linear or branched C1-C18 alkyl and $R_y$ selected from the group consisting of: hydrogen atom, hydroxyl, linear or branched C1-C6 alkoxyl and linear or branched C1-C18 alkyl, $R_7$ is chosen from: halogen; —NH-alkyl-Si—$(R_x)_3$ and —O-alkyl-Si—$(R_x)_3$ with linear or branched C1-C18 alkyl and $R_x$ selected from the group consisting of: hydrogen atom, hydroxyl, linear or branched C1-C6 alkoxy, linear or branched C1-C18 alkyl, polysilane chain —$(R_xSi(R_y)_2)_nR_y$ in which $R_x$ and $R_y$ are independently the same or different and chosen from the group consisting of: hydrogen atom, oxygen atom, hydroxyl, linear or branched C1-C6 alkyl, linear or branched C1-C18 alkyl and n is between 1 and 20, $X^-$ is an anion of an inorganic salt selected from: $Cl^-$, $ClO_4^-$, $BF_4^-$.

In some embodiments the composition F(I)+F(II) according to the invention comprises a mixture of compounds of formula F(I) as above defined and a mixture of compounds of formula F(II) as above defined.

The composition according to the invention may further comprise solvents, agents modifying the rheological properties, thickeners, adhesion agents, inorganic or organic catalysts.

In the composition according to the invention F(I) and F(II) are respectively in a weight ratio ranging from 0.5:1 to 50:1, preferably the weight ratio between F(I) and F(II) ranges from 1:1 to 40:1.

A second feature of the present invention relates to the process for preparing the composition according to the first aspect of the invention, comprising at least one compound of formula F(I) and at least one compound of formula F(II), having antimicrobial activity, which for simplicity will be hereinafter referred to as "F(I)+F(II)".

The process for preparing the composition is carried out by mixing at least one compound of formula F(I) with at least one compound of formula F(II) at a temperature between 0° C. and 50° C., for a variable time between 15 min and 2 hours, depending on the operating conditions of the different field of use of the composition. The composition F(I)+F(II) can be prepared immediately before the use thereof; alternatively it can be prepared, stored and used later.

The mixing of the compounds of Formula I with the compounds of Formula II can be carried out with the aid of a mechanical, magnetic stirrer or any other suitable means to mix the components of the composition and obtain a homogeneous composition. At the end of the mixing the composition F(I)+F(II) obtained is enterely ready for the subsequent use without requiring any purification step.

The process includes:

a) preparing the necessary amount of at least one compound F(I) and of at least one compound F(II) for a given composition,
b) mixing,
c) recovering the product, ready for use and/or for storage in light-shielding containers, at a temperature between 0° C. and 30° C., wherein, in step b) the mixing of at least one compound of formula F(I) with at least one compound of formula F(II) takes place at a temperature between 0° C. and 50° C., for a variable time between 15 min and 2 hours.

From the present description, the skilled in the field will easily understand that the method for preparing the compositions for the antimicrobial treatment of surfaces according to the present invention is extremely easy and versatile; it does not require the preparation of a monomer or a polymer and is obtained by simple direct mixing of the components of the composition. In addition, the quaternary ammonium salts derived from 1,3,5-triazine F (II) herein used provide a high reactivity allowing a simplified process for the preparation of the composition which enables a subsequent simple use.

Adversely, the known and/or commercially available alkyl quaternary ammonium salts have a low chemical reactivity and therefore require more complex, expensive and environmentally impacting formulations. Therefore, the present invention reduces, or eliminates, the need to use solvents, heavy metals or catalysts. Several are the industrial advantages of this type of products, namely:

- The used triazine quaternary ammonium salt F(II) is stable, easy to prepare, versatile, it does not require the use of solvents, and pre-polymerization steps.
- The preparation of the composition is very simple and consists in mixing the components at the operating temperature, reducing manufacturing time and costs.
- Long shelf life: the composition may be prepared immediately prior to use, either may be used months later after preparation.
- No pre-activation of the surfaces before treatment are required, improving environmental and economic sustainability compared to some procedures of the state of the art.
- No release of the antimicrobial and antifouling components in the environment in contact with the treated material or surface.

A third feature of the present invention relates to the method for using the disclosed composition, it is the process for making a surface or a material antimicrobial or antifouling comprising the application of the composition according to the invention on said surface or material by means of spray, coating, painting, troweling, deposition by immersion techniques.

The method of using the composition F(I)+F(II) obtained as above described is advantageous for the treatment of "virgin materials" or materials that have undergone a physical or chemical post-modification or pre-activation, such as e.g. Corona activation, Plasma, plasma with aerosol, laser, ozone, $H_2O_2/H_2SO_4$, $H_2O_2$. The term "virgin materials" means materials that have not undergone physico-chemical, refining or post-modification treatments.

Non-limiting examples of materials that can be treated with the composition according to the invention are: fabrics, steel, fiberglass, plastic materials, ceramics, composite materials, leather, wood, paper.

The application of the composition takes place through the normal techniques of spray, coating, painting, troweling, deposition by immersion, or other methods of use known to experts in the field.

The composition can be used as it is, without being diluted, or in the presence of one or more dispersants and/or diluents, for simplicity referenced as "D", depending on the type of composition and of the field of application of the material to be treaty. The dispersant is selected from the group of: organic solvents, water, silanes, polyesters, polyurethanes, polyacrylates, acrylic monomers, acrylic and epoxy resins, polyamides, polysilanes, polysiloxanes, phenolic resins, silicones, melamines, gelcoats and their mixtures. Organic solvents can be: halogenated, aliphatic ether, alcohols, ketones, esters, aromatic or aliphatic hydrocarbons, DMSO, amides, carbonates.

The composition F(I)+F(II) prepared as above described can be dispersed in one or more dispersants with a weight ratio D:(F(I)+F(II)) between 1 and 30. The dispersion process takes place at a variable temperature between 0° C. and 50° C., and may require a time between 15 min and 2 hours. By the process a homogeneous final solution, ready for use, is obtained.

In a particular embodiment, the composition according to the invention is added to a compound or composition usually used to form a coating onto the surface or onto a material to be made antimicrobial or antifouling, for example it is added to a paint or varnish.

According to the method of use, the composition F(I)+F(II) can be used without any particular precaution, even in combination with other surface treatments if required (pre or post-modifications).

The effectiveness of the treatment obtained on the various materials was verified by: microbiological tests on bacteria, molds and viruses; gas permeability test, such as $CO_2$, $H_2O$, $O_2$; release test of the antimicrobial agent from the material; surface spectroscopic analysis; washing test with acids and bases; resistance test of the coating in working conditions, for example in contact with food or resistance to marine conditions.

The treatment according to the invention has proved to be effective and to exert a strong inhibitory action against microorganisms responsible for the deterioration of products and surfaces of various materials, up to completely inhibiting their growth. The list of materials that may be treated according to the present invention is not exhaustive, preferably they are: polypropylene intended for the packaging of food and pharmaceutical products, leather, steel, steel for ventilation ducts, fiberglass, acrylic paints, fiberglass, plasterboard, polyethylene, epoxy resin, wood, paper, wallpaper, fabric.

The treatment obtained with the method of use of the present invention is stable over time, resists the wear related to the normal use of the final product on which it is applied and it does not need to be repeated.

The experimentation conducted has shown that neither the composition F(I)+F(II) providing the antimicrobial treatment, nor its components, in particular the silane compound of formula F(I) and the ammonium salt quaternary derivative of 1,3,5-triazine of formula F(II), are released from the surfaces and materials on which it is applied. This technical feature, experimentally verified by the migration test according to the current European legislation concerning materials intended for contact with food (CE1935/2004), constitutes a pivotal aspect for the use of compounds and compositions for this use both for the health sector and for food packaging, and in general for all applications where the treated surface comes into contact with humans, animals or the environment. For example, for antifouling paint applications, the present solution provides a great advantage over the most of products currently on the market releasing heavy metals into the marine environment [Miller J. Nanopart. Res. 2020, 22, 129].

The described composition, the procedure for its preparation and the method of use of the composition allow to obtain a surface treatment not releasing antimicrobial or antifouling substances and not containing metals.

The experimental results have shown that the treatment according to the present invention is useful for making gas impermeable food and pharmaceutical packaging made of linear hydrocarbon polymers. The composition and its method of use according to the present invention find application in the deposition of gas impermeable coating on surfaces of food and pharmaceutical packaging made of linear hydrocarbon polymers, such as polyethylene (PE), polybutene (PB), or polypropylene (PP). According to the invention, the surface and the material constituting food and pharmaceutical packaging made of linear hydrocarbon polymers are made gas impermeable by deposition of the composition according to the invention by spraying, coating, painting, printing, troweling, deposition by immersion.

The treatment according to the invention is suitable for being applied on steel surfaces, for example in machinery used in food industry, where it has been shown to resist even after several washing cycles.

A particularly advantageous use of the present invention concerns the spreading of an antifouling coating on naval hulls, the preparation of anti-mold acrylic vernish and for spreading an antibacterial/anti-mold coating on plasterboard, wherein 18 months after the treatment according to this the invention the plasterboard surface does not show phenomena of interaction, chromatic alteration and/or yellowing in the presence of paints, photocatalytic and protective water treatments applied previously to the coating.

The coating obtained by using the composition according to the invention has been shown to totally inhibit bacterial growth when applied to the floors of environments where a strict control or limitation of the bacterial load is required, such as for example hospitals, research or analysis laboratories, animal enclosures, livestock industry, slaughtering or food processing environments.

Furthermore, the results of the wide experimentation carried out with the composition of the invention and with the two components thereof singularly used, have demonstrated that Component F(I) has no antibacterial activity, while Component F(II) has antibacterial activity but it cannot be used for coating in the absence of F(I) as it is washed away from the surfaces and released from the treated materials in the environment, thereby the antimicrobic treatment is not permanent.

The composition and its method of use here described are also suitable for the treatment of materials deriving from the transformation of organic matrices such as paper, fabrics, and for the application of antibacterial coating on leather.

A further aspect of the invention relates to the materials and products, and the surfaces of the materials and products, treated by the process according to the present invention which confers on them antimicrobial and antifouling properties. In all cases, the materials treated according to the invention have shown suitability for use according to the guidelines required in several field.

The effectiveness of the process according to the invention was tested in different operating conditions, as widely described in the examples of the experimental section below.

EXAMPLES

Example 1: Preparation of a Composition F(I)+F(II) of (3-aminopropyl) triethoxysilane with 4-(4,6-dichloro-1,3,5-triazin-2-yl)-4-(3-dodecanamidopropyl) morpholin-4-ium chloride 69 g of F(I):(3-aminopropyl) triethoxysilane were introduced into a 500 ml container equipped with a stirrer and mixed, for 1 hour at room temperature, with 3.5 g of F(II):

4-(4,6-dichloro-1,3,5-triazin-2-yl)-4-(3-dodecanamidopropyl) morpholin-4-ium chloride.

Example 2: Preparation of a Composition F(I)+F (II) of (3-aminopropyl)trimethoxysilane with 1-(4-chloro-6-(dodecylamino)-1,3,5-triazin-2-yl)-1-methyl-1H-imidazol-1-ium chloride 130 g of F(I):(3-aminopropyl)trimethoxysilane were introduced into a 500 ml container equipped with a stirrer and mixed for 15 min at 35° C., with 13 g of F(II): 1-(4-chloro-6 -(dodecylamino)-1,3,5-triazin-2-yl)-1-methyl-1H-imidazol-1-ium chloride.

Example 3: Preparation of a Composition F(I)+F (II) of triethoxy(propyl)silane and 2-(triethoxysilyl) ethan-1-ol with 4-(4-chloro-6-(tetradecylamino)-1,3,5-triazin-2-yl)-4-ethylmorpholin-4-ium chloride and 4-(4-chloro-6-((3-(triethoxysilyl) propyl) amino)-1,3,5-triazine-2-yl)-4-(2-(decanoyloxy) ethyl) morpholin-4-ium chloride F(I): 4 g of triethoxy (propyl) silane and 11 g of 2-(triethoxysilyl)ethan-1-ol were introduced into a 100 ml container equipped with a stirrer and mixed for 2 hours at 15° C., with F(II): 5 g of 4-(4-chloro-6-(tetradecylamino)-1,3,5-triazin-2-yl)-4-ethylmorpholin-4-ium chloride and 2.5 g of 4-(4-chloro-6-((3-(triethoxysilyl)propyl)amino)-1,3,5-triazin-2-yl)-4-(2-(decanoyloxy)ethyl)morpholin-4-ium chloride.

Example 4: Preparation of a Composition F(I)+F (II) of (3-aminopropyl)triethoxysilane with 4-(4,6-dichloro-1,3,5-triazin-2-yl)-4-(3-dodecanamidopropyl) morpholin-4-ium chloride and 1-(4-chloro-6-(dodecylamino)-1,3,5-triazin-2-yl)-1-methyl-1H-imidazol-1-ium chloride F(I): 9 kg of (3-aminopropyl) triethoxysilane were mixed for 1.5 hours at 40° C., with F(II): 2.5 kg of 4-(4,6-dichloro-1,3,5-triazin-2-yl)-4-(3-dodecanamide-propyl)morpholin-4-ium chloride and 2 kg of 1-(4-chloro-6-(dodecylamino)-1,3,5-triazin-2-yl)-1-methyl-1H-imidazole-1-ium chloride.

Example 5: Preparation of a Composition F(I)+F (II) of 3-(dimethoxy(methyl)silyl) propan-1-amine with 4,6-dichloro-N,N-diethyl-N-octadecyl-1,3,5-triazin-2-ammonium chloride and 1-(4-chloro-6-methoxy-1,3,5-triazin-2-yl)-1-(2-(dodecanoyloxy) ethyl) piperidin-1-ium perchlorate F(I): 48 g of 3-(dimethoxy(methyl) silyl) propan-1-amine were mixed for 50 minutes at 10° C., with F(II): 15 g of 4,6-dichloro-N,N-diethyl-N-octadecyl-1,3,5-triazin-2-ammonium chloride and 17 g of 1-(4-chloro-6-methoxy-1,3,5-triazin-2-yl)-1-(2-(dodecanoyloxy)ethyl) piperidin-1-ium perchlorate.

Example 6: Preparation of a Composition F(I)+F (II) of propylsilanotriol with 1-(4-(hexadecylamino)-6-(2-(triethoxysilyl) ethoxy)-1,3,5-triazin-2-yl)-1-methylpyrrolidin-1-ium chloride and 1-(4-chloro-6-((3-(trimethoxysilyl)propyl)amino)-1,3,5-triazin-2-yl)-1-(5-tetradecanamidopentyl) pyrrolidin-1-ium chloride F(I): 105 g of propylsilanotriol were mixed for 2 hours at 25° C., with F(II): 100 g of 1-(4-(hexadecylamino)-6-(2-(triethoxysilyl) ethoxy)-1,3,5-triazin-2-yl)-1-methylpyrrolidin-1-ium chloride and 5 g of 1-(4-chloro-6-((3-(trimethoxysilyl)propyl)amino)-1,3,5-triazin-2-yl)-1-(5-tetradecanamidopentyl)pyrrolidin-1-ium chloride.

Example 7: Preparation of a Composition F(I)+F (II) of (3-aminopropyl) trimethoxysilane and triethoxy (3-isocyanatopropyl) silane with 1,1'-(6-chloro-1,3,5-triazin-2,4-diyl)bis(1-(3-tetradecanamidopropyl)-1H-imidazol- 1-ium) chloride and 1-(4,6-bis((3-(trimethoxysilyl) propyl) amino)-1,3,5-triazin-2-yl)-1-(4-(decanoyloxy) butyl)-1H-imidazol-1-ium chloride (FI): 300 mg of (3-aminopropyl) trimethoxysilane and 30 mg of triethoxy(3-isocyanatopropyl) silane were mixed for 20 minutes at room temperature, with F (II): 4 mg of 1,1'-(6-chloro-1,3,5-triazin-2,4-diyl)bis(1-(3-tetradecanamidopropyl)-1H-imidazol-1-ium) chloride and 4.25 mg of 1-(4,6-bis((3-(trimethoxysilyl)propyl) amino)-1,3,5-triazin-2-yl)-1-(4-(decanoyloxy)butyl)-1H-imidazol-1-ium chloride.

Example 8: Preparation of a Composition F(I)+(F (II) of triethoxy(propyl)silane and 3-(trimethoxysilyl)propan-1-thiol with 1-(4-ethoxy-6-((3-(trimethoxysilyl)propyl)amino)-1,3,5-triazin-2-yl)-1-(7-nonanamidoeptyl)piperidin-1-ium chloride and 1-(4-chloro-6-((3-(triethoxysilyl)propyl) amino)-1,3,5-triazin-2-yl)-1-(2-(dodecanoyloxy) ethyl) pyrrolidin-1-ium chloride F (I): 5 g of triethoxy (propyl) silane and 0.5 g of 3-(trimethoxysilyl)propan-1-thiol were mixed for 45 minutes at 10° C., with F(II): 0.5 g of 1-(4-ethoxy-6-((3-(trimethoxysilyl)propyl)amino)-1,3,5-triazin-2-yl)-1-(7-nonanamidoheptyl)piperidin-1-ium chloride and 0.32 g of 1-(4-chloro-6-((3-(triethoxysilyl)propyl)amino)-1,3,5-triazin-2-yl)-1-(2-(dodecanoyloxy)ethyl)pyrrolidin-1-ium chloride.

Example 9: Use of a F (I)+F (II) Composition for Deposition of Antimicrobial Coating on a Polypropylene Surface for Food and Pharmaceutical Packaging 72.5 g of F(I)+F(II) composition prepared according to example 1 were diluted in 344 g of ethanol for 30 minutes and applied by airbrush on 13 $m^2$ of a polypropylene (PP) surface pre-activated by corona treatment. In order to simulate the life cycle of the packaging, the treated PP surface obtained (PPt) was washed at high pressure with basic solutions, i.e. pH 12, at T=50° C. for 10 washing cycles ($PP_{t+1}$). The antimicrobial activity was assessed on untreated PP samples (PP), samples treated with the method of the invention ($P_t$) and samples treated with the method of the invention and subsequently placed under the conditions of a normal packaging life cycle ($PP_{t+1}$) by the AATCC 147 qualitative test against *Staphylococcus aureus* ATCC 6538 (Gram-positive) and *Klebsiella pneumoniae* ATCC 4352 (Gram-negative) bacteria. The results are presented in table 1 and the bacterial growth data is shown in FIG. 1. Similar results have been obtained in the treatment of PP surfaces that have not undergone any pre-activation and glass surfaces. The bacterial inhibition detected on polypropylene surface treated with a composition comprising only F(II) was only temporary, immediately after the treatment, the effect was not stable in the time or permanent as obtained by using F(I)+F(II) compositions.

TABLE 1

| Assessment of antimicrobial activity on su PP - AATCC 147 Test | | | | | | |
|---|---|---|---|---|---|---|
| | *Staphylococcus aureus* ATCC 6538 | | | *Klebsiella pneumoniae* ATCC 4352 | | |
| | F(I) | F(II) | F(I) + F(II) | F(I) | F(II) | F(I) + F(II) |
| PP | X | X | X | X | X | X |
| $PP_t$ | X | I | ✓ | X | I | ✓ |
| $PP_{t+1}$ | X | I | ✓ | X | I | ✓ |

X: bacteria growth,
✓: Total inhibition of bacteria growth,
I: temporary bacteria inhibition up to 50%.

Example 10: Use of a F (I)+F (II) Composition for Spreading a Antibacterial Coating onto Leather 72.5 g of F(I)+F(II) composition prepared as described in example 1, were dispersed in 172.5 g of ethanol/water solution (4/1 weight/weight). The mixture was stirred for 1 hour at room temperature and applied by airbrush onto 10 $m^2$ of tanned and finished leather. The sample thus obtained is indicated with $C_{t-a}$.

The same composition was also applied onto the leather by immersion. The leather was immersed for 5 minutes in the mixture of composition F(I)+F(II) of example 1, dispersed in ethanol/water (4/1 weight/weight). After 5 minutes the leather was extracted and dried. The sample thus obtained is indicated as $C_{t-i}$. The antibacterial properties of the coating applied to the leather with the two application methods were analyzed and evaluated according to the AATCC 147 qualitative test against *Staphylococcus aureus*. Bacterial growth data are shown in Table 2.

TABLE 2

| Assessment of antimicrobial activity on leather - AATCC 147 Test | | | |
|---|---|---|---|
| | *Staphylococcus aureus* ATCC 6538 | | |
| | F(I) | F(II) | F(I) + F(II) |
| C | X | X | X |
| $C_{t-a}$ | X | I | ✓ |
| $C_{t-i}$ | X | I | ✓ |

X: bacteria growth,
✓: Total inhibition of bacteria growth,
I: temporary bacteria inhibition up to 50%.

Example 11: Use of a F (I)+F (II) Composition for Deposition of Antibacterial Coating on a Steel Surface 143 g of F(I)+F(II) composition prepared as described in example 2 was diluted in 600 g of methanol/isopropanol solution (5/1 weight/weight) and applied by airbrush onto a 30 $m^2$ steel surface (test $A_t$). To verify the resistance of the treatment, the $A_t$ test surface was washed with a commercial solution of hydrogen peroxide and acetic, peracetic and phosphoric acids at 25° C. for 5 times in 15 minutes in order to simulate the washing cycles at which the machines for the food bottling is subjected over a year (test $A_{t+1}$ Table 3). The assessment of the antibacterial activity on untreated control steel surface (test A), on surface subjected to the treatment according to the invention (test $A_t$) and on steel treated surfaces subjected to the treatment and then to the washing cycles (test $A_{t+1}$) was performed according to ISO 22196 against *Bacillus subtilis*. The results are shown in Table 3. Notably, when the composition containing only F(II) was used the antibacterial activity detected immediately after coating did not permain in the material.

TABLE 3

| Assessment of the antibacterial activity onto a steel surface - ISO 22196 Test | | | |
|---|---|---|---|
| | *Bacillus subtilis* | | |
| | F(I) | F(II) | F(I) + F(II) |
| A | $3.1 \times 10^7$ CFU/ 10 $cm^2$ | $3.2 \times 10^7$ CFU/ 10 $cm^2$ | $3.4 \times 10^7$ CFU/ 10 $cm^2$ |
| $A_t$ | $3.5 \times 10^7$ CFU/ 10 $cm^2$ | $6.0 \times 10^3$ CFU/ 10 $cm^2$ | Bacteria growth not detected |
| $A_{t+1}$ | $3.9 \times 10^7$ CFU/ 10 $cm^2$ | $8.0 \times 10^6$ CFU/ 10 $cm^2$ | $9.0 \times 10^3$ CFU/ 10 $cm^2$ |

Example 12: Use of a Composition F (I)+F (II) for the Preparation of Anti-Mold Acrylic Vernish 22.5 g of F(I)+F(II) composition prepared as described in example 3 were mixed with 150 g of acrylic paint diluted in 22.5 g of water. The mixing was continued for 10 minutes at 30° C., the product obtained was applied onto 2 $m^2$ of wall surface by brush and allowed to air dry for 18 hours at room temperature ($SM_t$ test). The assessment of the antifungal action of the composition on the surface was carried out according to the ASTM G-21 qualitative test wherein the untreated wall surface (SM test) and the treated one ($SM_t$ test) were subjected to mold growth inhibition tests by contact against the fungal strains *Alternaria alternata* and *Cladosporium cladosporioides* and compared to the antifungal activity determined by the two component F(I) and F(II) singularly added to the diluted acrylic paint and used on the surfaces (Table 4).

TABLE 4

| Assessment of the antifungal efficacy on a wall surface - Qualitative test ASTM G-21 | | | | | | |
|---|---|---|---|---|---|---|
| | *Alternaria alternata* | | | *Cladosporium cladosporioides* | | |
| | F(I) | F(II) | F(I) + F(II) | F(I) | F(II) | F(I) + F(II) |
| SM | X | X | X | X | X | X |
| $SM_t$ | X | I | ✓ | X | I | ✓ |

X: bacteria growth,
✓: Total inhibition of bacteria growth,
I: temporary inhibition up to 50%.

Example 13: Use of a F(I)+F(II) Composition for Deposition of Antifouling Coating onto Naval Hulls 13.5 g of antifouling F(I)+F(II) composition prepared according to example 4 were diluted in 13.5 kg of commercial gelcoat for boats, mixed with the aid of a stirrer for 20 minutes and the mixture was applied with a spray gun on 90 $m^2$ of fiberglass boat hull. The coating was air dried for 18 hours before the boat was launched. The effect of the antifouling treatment was verified over time (up to 12 months) by observing the inhibition of algae growth on the treated parts of the hull when submerged in a marine environment. The test showed a slowdown in the adhesion and growth of algae on the hull of the boat, compared to the reference untreated portion of the hull. Comparative boat hull treated with the gelcoat for boat containing only one of the compound F(I) or F(II) showed no antifouling activity when the composition contains F(I), the antifouling treatment with the composition comprising only F(II) was totally ineffective as it was washed away from the surface.

Example 14: Use of a F (I)+F (II) Composition for Spreading an Antibacterial/Anti-Mold Coating on Plasterboard 80 g of F(I)+F(II) composition prepared as described in example 5, were dispersed in 1.2 kg of consolidating acrylic primer for plasterboard and 0.24 kg of water. The mixture was stirred for 1 hour at T=28° C. and applied by brush onto 10 $m^2$ of plasterboard (test $C_{At}$). The antibacterial/anti-mold properties of the plasterboard treated by the composition according to the invention ($C_{At}$) were analyzed and verified by means of AATCC 147 test against *Staphylococcus aureus* bacteria and ASTM G-21 qualitative test against the fungal strain *Cladosporium cladosporioides*, compared to the control treatment onto non-plasterboard surface (CA test) Furthermore, the compatibility of the coating with additional treatments performed on the building material such as coloring, photocatalytic or waterproofing treatments was verified. The analysis of the treated surface 18 months after the treatment according to the present invention did not reveal interaction events or chromatic alteration and/or yellowing in the presence of paints, photocatalytic and protective water treatments applied prior the coating.

TABLE 7

Assessment of the antimicrobial and antifungal activity onto a plasterboard surface - Qualitative tests AATCC 147 e ASTM G-21

| | *Staphylococcus aureus* | *Cladosporium cladosporioides* |
|---|---|---|
| CA | X | X |
| $CA_t$ | ✓ | ✓ |

X: bacteria growth, ✓: Total inhibition of bacteria growth.

Example 15: Use of a F (I)+F (II) Composition for the Treatment of Floors 80 g of F(I)+F(II) composition prepared as described in example 5 were dispersed in 1.95 kg of epoxy resin for floor covering. The mixture was stirred in an industrial mixer for 5 minutes at 35° C. and applied with a trowel onto 10 $m^2$ of concrete floor (test $P_t$). The antibacterial properties of the treated floor ($P_t$) were verified by AATCC 147 tests and compared with an untreated floor surface (P). The results obtained from the experimentation are shown in Table 8. Only when a composition comprising both F(I) and F(II) was used onto the epoxy resin floor the antimicrobial activity was found.

TABLE 8

Assessment of the antimicrobial activity onto a an epoxy resin floor - Test AATCC 147

| | *Staphylococcus aureus* | | | *Klebsiella pneumoniae* | | |
|---|---|---|---|---|---|---|
| | F(I) | F(II) | F(I) + F(II) | F(I) | F(II) | F(I) + F(II) |
| P | X | X | X | X | X | X |
| $P_t$ | X | X | ✓ | X | X | ✓ |

X: bacteria growth,
✓: Total inhibition of bacteria growth.

Example 16: Use of a F (I)+F (II) Composition for Sanitizing Ducts and Filters of Ventilation Systems 80 g of F(I)+F(II) composition prepared as described in example 5 were dispersed in 96 g of methanol/water solution (9/1 weight/weight). The mixture was stirred for 15 minutes at room temperature and applied by airbrush onto a 2 $m^2$ of steel surface (test $A_t$) for ventilation ducts. The antibacterial properties of the treated steel ($A_t$) were assessed according to ISO 22196 by contacting with *Bacillus subtilis* and compared with untreated steel surface (test A). A second batch of the same mixture was used to treat 2 $m^2$ of. The treated polyester or glass fiber air filters were found to inhibit the bacteria growth of bacteria as well as steel surfaces. Bacterial growth was detected when polyester or glass fiber air filters were treated with F(I) or F(II) singularly used in the composition.

TABLE 9

Assessment of the antimicrobial activity onto a steel surface - ISO 22196 Test.

| | *Bacillus subtilis* |
|---|---|
| A | $2.0 \times 10^7$ CFU/10 $cm^2$ |
| $A_t$ | Total inhibition of bacteria growth |

Example 17: Use of a F (I)+F (II) Composition for the Spreading of Anti-Mold Coating on Wood 210 g of F(I)+F(II) composition of example 6 were dispersed in 1.05 kg of protective impregnation for wood based on aqueous polyurethane resin. The mixture was stirred with a stirrer for 25 minutes at 20° C. and applied by brush onto 12 $m^2$ of wooden surface (test $L_t$). The anti-mold properties of the treated wood ($L_t$) were evaluated by ASTM G-21 qualitative test against the fungal strain *Alternaria alternata* and compared to the control untreated wood surface(L). Wood surface treated with a composition comprising only F(II) initially has shown bacteria inhibition, but in the time the effect decreased and at the end of the experimentation the same fungal growth as untreated control was observed. The obtained results are shown in Table 10.

TABLE 10

Assessment of antifungal activity onto a wood surface - Qualitative test ASTM G-21

| | *Alternaria alternata* | | |
|---|---|---|---|
| | F (I) | F (II) | F (I) + F (II) |
| L | X | X | X |
| $L_t$ | X | X | ✓ |

X: Fungal growth, ✓: Total inhibition of fungal growth.

Example 18: Use of a F (I)+F (II) Composition for the Spreading of Anti-Mold Coating on Paper 338.25 mg of F(I)+F(II) composition prepared as described in example 7 were dispersed in 1.7 mL of water. The mixture was stirred for 15 minutes at 50° C. and applied by a roller onto 0.06 $m^2$ of wallpaper ($CP_t$ test). The antimicrobial properties of the treated material are verified by ASTM G-21 qualitative test against *Alternaria alternata*. The data are shown in table 11.

TABLE 11 assessment of antifungal properties on paper - Qualitative test ASTM G-21

| | *Alternaria alternata* | | |
|---|---|---|---|
| | F (I) | F (II) | F (I) + F (II) |
| L | X | X | X |
| $L_t$ | X | X | ✓ |

X: fungal growth, ✓: Total inhibition of fungal growth.

Example 19: Use of a F (I)+F (II) Composition for Preparation of Antibacterial Fabrics 6.32 g of F (I)+F (II) composition prepared as described in example 8 were dispersed in 28 mL of isopropanol and applied by immersion on 1 $m^2$ of fabric (Tt test). The antibacterial properties of the treated tissue were verified according to the AATCC 147 assay against the bacterial strains *Staphyilococcus aureus* and *Klebsiella pneumoniae* compared to the untreated control tissue (test T). The data are shown in Table 12. The treatment of the same fabric with isopropanol comprising only one of the two component, either F(I) or F(II) demonstrated not to permanent. The antibacterial activity associated to F(II) was lost in the subsequent processing steps to which the fabric treated with a composition comprising only F(II) was subjected.

TABLE 12

AATCC 147 Test on fabrics.

| | *Staphyilococcus aureus* | | | *Klebsiella pneumoniae* | | |
|---|---|---|---|---|---|---|
| | F(I) | F(II) | F(I) + F(II) | F(I) | F(II) | F(I) + F(II) |
| T | X | X | X | X | X | X |
| $T_t$ | X | X | ✓ | X | X | ✓ |

X: bacteria growth,
✓: Total inhibition of bacteria growth.

Example 20: Use of a F(I)+F(II) Composition for Deposition of Gas Impermeable Antimicrobial Coatings on a Polyethylene (PE) Surface for Food Packaging 13.5 g of antimicrobial F(I)+F(II) composition prepared as described in example 4 were diluted in 40 kg of a methylethylketone/ethanol solution (9/1 w/w). The mixture was mixed for 40 minutes at 30° C. and applied by vaporized aerosol onto 423 $m^2$ of post lamination polyethylene (PE) sheets, two coatings were carried out. The treated PE ($PE_t$ test) was tested to evaluate both its impermeability to gases ($O_2$, $CO_2$ and water vapor) and its suitability for contact with food by means of a release test in compliance with the COMMISSION REGULATION (EU) No 10/2011 of 14 Jan. 2011 on plastic materials and articles intended to come into contact with food. (Tables 13-14).

TABLE 13

Determination of gas permeability on PE - ASTM test

| gas | Test ASTM | PE | $PE_t$ | Unit |
|---|---|---|---|---|
| Water vapor | F 1249-13 | 5.5 | 4.3 | g/($m^2$ × 24 h) |
| $O_2$ | D 3985-17 | 2984 | 946 | cc/($m^2$ × 24 h × atm) |
| $CO_2$ | F 2476-13 | 9092 | 2620 | cc/($m^2$ × 24 h × atm) |

TABLE 14

Release assessment- Migration test according to Commission Regulation (EU) No 10/2011 of 14 Jan. 2011

| Food Simulant | Release |
|---|---|
| Ethanol 10% (v/v) | no |
| Ethanol 20% (v/v) | no |
| Ethanol 50% (v/v) | no |
| Acetic ccid 3% (w/v) | no |
| Vegetable oil | no |

The same technical effect was not detected when compositions comprising only F(I) or only F(II) were used.

The invention claimed is:

1. A composition comprising at least one silane compound F(I), and at least one triazine quaternary ammonium salt F(II), wherein F(I) is (3-aminopropyl)triethoxysilane and F(II) is 4-(4,6-dichloro-1,3,5-triazin-2-yl)-4-(3-dodecanamidopropyl)morpholin-4-ium chloride; or wherein F(I) is (3-aminopropyl) trimethoxysilane and F(II) is 1-(4-chloro-6-(dodecylamino)-1,3,5-triazin-2-yl)-3-methyl-1H-imidazole-3-ium chloride; or wherein F(I) is a mixture of triethoxy (propyl) silane and 2-(triethoxysilyl) ethan-1-ol, and F(II) is a mixture of 4-(4-chloro-6-(tetradecylamino)-1,3,5-triazin-2-yl)-4-ethylmorpholin-4-ium chloride and 4-(4-chloro-6-((3-(triethoxysilyl)propyl) amino)-1,3,5-triazin-2-yl)-4-(2-(decanoyloxy) ethyl)morpholin-4-ium chloride; or wherein F(I) is (3-aminopropyl) triethoxysilane, and F(II) is a mixture of 4-(4,6-dichloro-1,3,5-triazin-2-yl)-4-(3-dodecanamidopropyl) morpholin-4-ium chloride and 1-(4-chloro-6-(dodecylamino)-1,3,5-triazin-2-yl)-3-methyl-1H-imidazol-3-ium chloride; or wherein F(I) is 3-(dimethoxy (methyl) silyl) propane-1-amine, and F(II) is a mixture of 4,6-dichloro-N,N-diethyl-N-octadecyl-1,3,5-triazin-2-ammonium chloride and 1-(4-chloro-6-methoxy-1.3.5-triazin-2-yl)-1-(2-(dodecanoyloxy) ethyl) piperidin-1-ium perchlorate; or wherein F(I) is propylsilanotriol, and F(II) is a mixture of 1-(4-(hexadecylamino)-6-(2-(triethoxysilyl) ethoxy)-1, 3,5-triazin-2-yl)-1-methylpyrrolidin-1-ium chloride and 1-(4-chloro-6- ((3-(trimethoxysilyl) propyl) amino)-1,3,5-triazin-2-yl)-1-(5-tetradecanamidopentyl)pyrrolidine-1-ium chloride; or wherein F(I) is a mixture of (3-aminopropyl) trimethoxysilane and triethoxy (3-isocyanatopropyl) silane, and F(II) is a mixture of 1.1'-(6-chlorine-1,3,5-triazin-2,4-diyl)bis (1-(3-tetradecanamidopropyl)-1H-imidazol-1-ium) chloride and 1-(4,6-bis ((3-(trimethoxysilyl)propyl)amino)-1,3,5-triazin-2-yl)-1-(4-(decanoyloxy) butyl)-1H-imidazol-1-ium chloride; or wherein F(I) is a mixture of triethoxy(propyl) silane and 3-(trimethoxysilyl) propan-1-thiol, and F(II) is a mixture of 1-(4-ethoxy-6-((3-(trimethoxysilyl)propyl) amino)-1,3,5-triazin-2-y1)-1-(7-nonanamidoheptyl)piperidine-1-ium chloride and 1-(4-chloro-6- ((3-(triethoxysilyl)propyl)amino)-1,3,5-triazin-2-yl)-1-(2-(dodecanoyloxy)ethyl) pyrrolidine-1-ium chloride.

2. The composition according to claim 1 wherein F(I) and F(II) are respectively in a weight ratio ranging from 0.5:1 to 50:1.

3. The composition according to claim 1 wherein F(I) and F(II) are respectively in a weight ratio ranging from 1:1 to 40:1.

4. The composition according to claim 1 further comprising a solvent, a rheological property modifier, a thickener, an adhesion agent, an inorganic catalyst or an organic catalyst.

5. A process for preparing the composition according to claim 1 comprising the steps of:

a) preparing an amount of at least one compound F(I) and an amount of at least one compound F(II) necessary for the composition, b) mixing, and c) recovering the composition according to claim 1.

6. The process according to claim 5 wherein the mixing takes place at a temperature between 0° C. and 50° C., for a variable time between 15 minutes and 2 hours.

7. The process according to claim 5 wherein the mixing is carried out by a mechanical means or a magnetic stirrer.

8. A process for making a surface or material permanently antimicrobial or antifouling, the process comprising applying the composition according to claim 1 on the surface or material by spraying, coating, painting, trowelling, or deposition by immersion.

9. The process according to claim 8 further comprising diluting the composition in at least one dispersing agent or diluent selected from the group of: an organic solvent, water, a silane, a polyester, a polyurethane, a polyacrylate, an acrylic monomer, an acrylic resin, an epoxy resin, a polyamide, a polysilane, a polysiloxane, a phenolic resin, a silicone, a melamine, and a gelcoat.

10. The process according to claim 9 wherein the organic solvent is selected from the group consisting of a halogenated organic solvent, an aliphatic ether, an alcohol, a ketone, an ester, an aromatic hydrocarbon, an aliphatic hydrocarbon, DMSO, an amide, and a carbonate.

11. The process according to claim 9 wherein the composition is dispersed in at least one dispersing agent with a weight ratio (weight/weight) of dispersing agent: composition of between 1 and 30.

12. The process according to claim 9 wherein the diluting takes place at a temperature ranging from 0° C. to 50° C., for a time ranging from 15 minutes to 2 hours.

13. The process according to claim 9 wherein the diluting takes place by mixing conducted with the aid of a mechanical means or a magnetic stirrer.

14. The process according to claim 8 further comprising adding the composition to a compound or another composition used to form a coating on the surface or on the material without releasing a toxic substance in the environment.

15. The process according to claim 8 wherein the surface or material is selected from the group consisting of: polypropylene for food or pharmaceutical product packaging, leather, steel, ventilation duct steel, fiberglass, non-acrylic paint, acrylic paint, fiberglass, plasterboard, polyethylene, epoxy resin, wood, paper, wallpaper, and fabric.

16. An antimicrobial and antifouling material comprising a surface permanently having antimicrobial and antifouling properties, which is obtained by the process according to claim 8.

17. A method for preparing a gas impermeable food and pharmaceutical packaging, comprising combining the composition according to claim 1 with a food and pharmaceutical packaging made of a linear hydrocarbon polymer.

18. The method according to claim 17 wherein the linear hydrocarbon polymer is selected from the group consisting of polyethylene (PE), polybutene (PB) and polypropylene (PP).

19. The method according to claim 17, wherein the combining comprises applying the composition on a surface or a material of the food and pharmaceutical packaging by spraying, coating, painting, trowelling, or deposition by immersion.

* * * * *